L. B. AUSTIN.
Milk-Cooler.
No. 212,830. Patented Mar. 4, 1879.
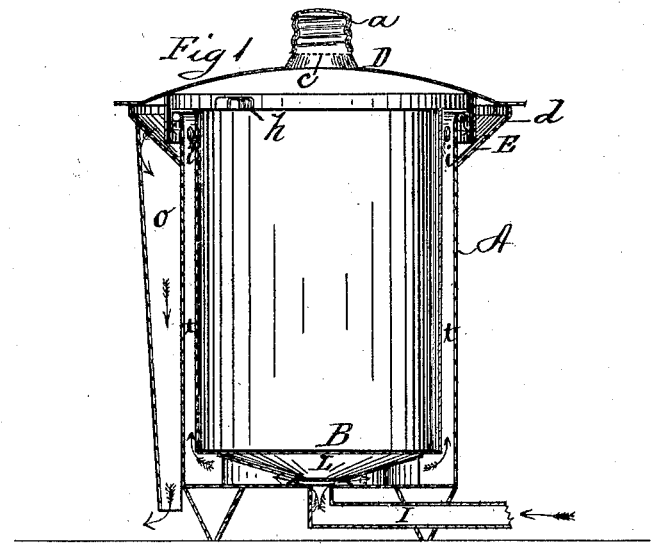
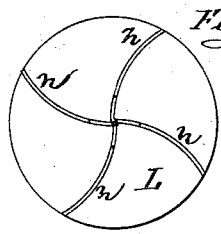
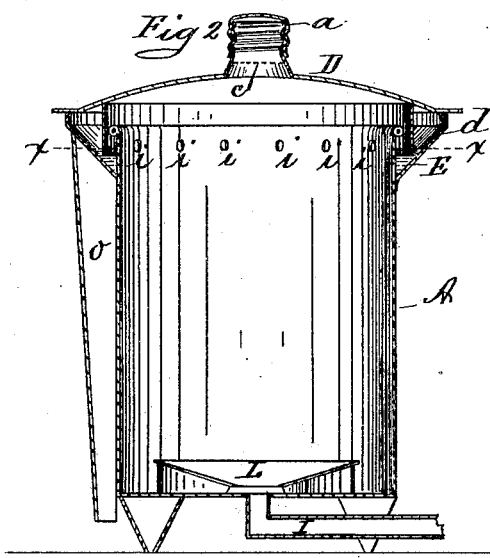

UNITED STATES PATENT OFFICE.

LEAVITT B. AUSTIN, OF HOLYOKE, MASSACHUSETTS.

IMPROVEMENT IN MILK-COOLERS.

Specification forming part of Letters Patent No. 212,830, dated March 4, 1879; application filed October 21, 1878.

*To all whom it may concern:*

Be it known that I, LEAVITT B. AUSTIN, of Holyoke, county of Hampden, and State of Massachusetts, have invented new and useful Improvements in Milk-Coolers, which improvements are fully set forth in the annexed specification and in the accompanying drawings.

The object of my invention is to provide a milk-cooler in which there shall be a more perfect circulation of running water between the milk and water vessels, and in which provision is made for a water-sealed milk-can cover, so arranged that no stagnant water can absorb the fumes from warm milk.

My invention consists in interposing between the bottom of a water-vessel and the bottom of a milk-can placed therein a deflector with curved wings stationed centrally over a water-inlet in the bottom of said water-vessel, whereby the incoming stream of water is directed laterally and spirally between the vertical sides of said can and water-vessel.

Referring to the drawings, Figure 1 shows a vertical section of my milk-cooler and can complete. Fig. 2 shows a vertical section with the milk-can removed. Fig. 3 shows a view of the under side of the deflector, showing the form of the curved partitions thereon from the center to its border.

A is the water-vessel. B is the milk-can. D is the cover. $a$ is a screw-capped ventilator on the cover, with a wire-gauze strainer, $c$, fixed across its air-passage. $d$ is the rim of the cover, dipping below the water-line $x\,x$, Fig. 2, in the trough. E is the water-trough. $i\,i$ are outlet-holes for water from vessel A into water-trough E. I is the inlet-pipe. L is a water-deflector. $n\,n$ are curved partitions on the under side of deflector L. O is the outlet-pipe, attached to and drawing water from the trough E down to the water-line $x\,x$. $h$ is one of two handles on the top border of can B.

It will be seen that my improved milk-cooler consists of a water-vessel, A, to which is attached, by inlet I, a water-pipe, conducting a current of water through the center of the bottom thereof under some head; a deflector, L, on the bottom of vessel A, presenting a convex face next to said bottom, having fixed upon said convex face curved partitions $n$, which partitions radiate from the center of the deflector to its border, their lower edges lying close against the bottom of the vessel A, and which deflector may be fixed upon the bottom of vessel A or not, in which latter case it would be held down by the weight of can B; water-outlet holes $i$ around the sides of said vessel, near its top; a trough, E, around the upper border of the vessel; a discharge-pipe, $o$, leading from said trough; a cover, D, protecting the contents of can B, covering over trough E, its border extending beyond the edge of the latter and resting thereupon, having on its top a screw-capped ventilator, $a$, with a wire-gauze strainer or dirt-arrester, $c$, fixed across it, and a rim, $d$, secured to the under side of said cover, made of such width that it descends into the trough E below the water-line $x\,x$, but not to the bottom of it; a milk-can, B, made of proper size to be suspended by its rim inside of vessel A, and leave a water-circulating space, $t$, between the two vessels.

The arrows on Fig. 1 represent the general course of the flowing water into, through, and out of the cooler.

The can may be lowered into and drawn from the water-vessel by the use of any of the ordinary appliances by attaching them to handle $h$.

My milk-cooler is employed in the following manner, viz: Having been located as above stated, can B is supplied with the milk to be cooled, lowered into vessel A, cover D is placed thereon, and water is turned on through inlet I. Immediately the water enters the bottom at the center directly under the central point of the deflector L, whence it is forced upward and in direction spirally around in space $t$ between the two vessels, said spiral direction being given to the water-current by the curved partitions $n$ on the under side of deflector L. The water-current flows up and out through holes $i$ into trough E, and away from the latter through discharge-pipe $o$.

By the construction of trough E as above described, a uniform depth of water is maintained in it, and into said water the bottom edge of rim $d$ on cover D sits sufficiently deep to seal it air-tight. I arrange the water-seal for rim $d$ so that the water in which the rim sits will be constantly renewed and fresh.

Such a seal arranged to be used otherwise than with running water would not be desirable for this purpose. Thus arranged, water is allowed to flow through the vessel until the temperature of the milk is sufficiently reduced, when it is removed, as heretofore stated.

When it is desired to admit air to the milk during the process of cooling, the screw-cap to ventilator $a$ may be removed. In this case the gauze strainer $c$ prevents any dirt or insects from passing through into the milk.

Can B may be constructed with a faucet on or near the bottom to draw off the cooled milk, and vessel A may also have a faucet inserted at the bottom, by which to empty it of water when desired.

It will be observed that such a cover as I have described and shown serves to perfectly protect the contents of can B, and at the same time covers over the water-current in trough E, and prevents any evaporation therefrom into the milk-room, which is an essential condition in the preparation of milk for cheese-making, &c.

In the construction of a milk-cooler as above set forth I secure all the advantages of a constant water-circulation under the best conditions for its desired effect upon the milk, comparative cheapness in cost, and I avoid all complication of circulating-pipes, so common in milk-coolers.

I do not claim constructing a milk-cooler in which water circulates between the sides of the milk-can and water-vessel, nor with a discharge-trough around the upper edge of the water-vessel, for neither of these is new; but

What I claim as my invention is—

A milk-cooler consisting of the water-vessel A and milk-can B, and having interposed between the bottoms of said vessel and said can, over the inlet-pipe I, the convex deflector L, with its curved partitions $n$, substantially as and for the purpose set forth.

LEAVITT B. AUSTIN.

In presence of—
H. A. CHAPIN,
WM. H. CHAPIN.